United States Patent [19]
Dent et al.

[11] Patent Number: 5,991,635
[45] Date of Patent: Nov. 23, 1999

[54] REDUCED POWER SLEEP MODES FOR MOBILE TELEPHONES

[75] Inventors: Paul W. Dent, Pittsboro; Nils R. Rydbeck, Cary; A. Krister Raith, Durham, all of N.C.; Francois Sawyer, St.-Hubert, Canada

[73] Assignee: Ericsson, Inc., Research Triangle Park, N.C.

[21] Appl. No.: 08/768,976

[22] Filed: Dec. 18, 1996

[51] Int. Cl.⁶ .................................................. H04B 7/26
[52] U.S. Cl. .......................... 455/517; 455/38.3; 455/343
[58] Field of Search .................. 455/422, 38.1, 455/38.3, 507, 517, 550, 572, 574, 575, 343, 458

[56] References Cited

U.S. PATENT DOCUMENTS

| | | | |
|---|---|---|---|
| 4,449,248 | 5/1984 | Leslie et al. | 455/38 |
| 4,475,408 | 10/1984 | Browning | 73/862.12 |
| 4,794,649 | 12/1988 | Fujiwara | 455/9 |
| 5,027,428 | 6/1991 | Ishiguro et al. | 455/67 |
| 5,091,942 | 2/1992 | Dent | 380/46 |
| 5,140,698 | 8/1992 | Toko | 455/76 |
| 5,140,702 | 8/1992 | Laflin | 455/166.1 |
| 5,146,214 | 9/1992 | Yamada et al. | 340/825.03 |
| 5,150,361 | 9/1992 | Wieczorek et al. | 370/95.1 |
| 5,187,471 | 2/1993 | Wagai et al. | 340/825.44 |
| 5,193,211 | 3/1993 | Nobusawa | 455/38.2 |
| 5,204,986 | 4/1993 | Ito et al. | 45/343 |
| 5,230,084 | 7/1993 | Nguyen | 455/38.3 |
| 5,241,568 | 8/1993 | Fernandez et al. | 375/116 |
| 5,252,963 | 10/1993 | Snowden et al. | 340/825.44 |
| 5,265,270 | 11/1993 | Stengel et al. | 455/343 |
| 5,274,843 | 12/1993 | Murai et al. | 455/38.3 |
| 5,301,225 | 4/1994 | Suzuki et al. | 379/59 |
| 5,590,396 | 12/1996 | Henry | 455/343 |
| 5,649,315 | 7/1997 | Eaton | 455/343 |
| 5,710,975 | 1/1998 | Bernhardt et al. | 455/343 |

FOREIGN PATENT DOCUMENTS

| | | |
|---|---|---|
| 94/13089 | 6/1994 | WIPO . |
| 96/08941 | 3/1996 | WIPO . |

OTHER PUBLICATIONS

ANNEX 12, MMT Doc 900–3 15.12,1989 "Specification for a Handheld Mobile Station with Battery Saving Function, BMS (Option)".

*Primary Examiner*—Thanh Cong Le
*Attorney, Agent, or Firm*—Burns, Doane, Swecker & Mathis, L.L.P.

[57] ABSTRACT

In a mobile radio-telephone system including at least one base station transmitting information to subscriber telephones indicating whether they are being called, a method comprising the steps of dividing a repetitive frame period into a number of sleep-mode slots, determining a sleep-mode slot number to be used for transmitting a call to a particular subscriber telephone using an assigned subscriber telephone number, transmitting a calling message in said determined sleep-mode slot including the assigned subscriber telephone number, repeating transmission of the calling message a number of times as determined by system loading and available capacity to transmit such calls, and transmitting an indication of the number of repeated transmissions capacity and loading currently permits.

18 Claims, 6 Drawing Sheets

```
 0  1  2  3  4  5  6  7  8  9 10 11 12 13 14  0
 1  2  3  4  5  6  7  8  9 10 11 12 13 14  0  1
 2  3  4  5  6  7  8  9 10 11 12 13 14  0  1  2
 3  4  5  6  7  8  9 10 11 12 13 14  0  1  2  3
 4  5  6  7  8  9 10 11 12 13 14  0  1  2  3  4
 .  .  .  .  9  .  .  .  .  .  .  .  .  .  .  .
 .  .  .  . 10  .  .  .  .  .  .  .  .  .  .  .
 .  .  .  . 11  .  .  .  .  .  .  .  .  .  .  .
 .  .  .  . 12  .  .  .  .  .  .  .  .  .  .  .
 .  .  .  . 13  .  .  .  .  .  .  .  .  .  .  .
 .  .  .  . 14  .  .  .  .  .  .  .  .  .  .  .
 .  .  .  .  0  .  .  .  .  .  .  .  .  .  .  .
 .  .  .  .  1  .  .  .  .  .  .  .  .  .  .  .
 .  .  .  .  2  .  .  .  .  .  .  .  .  .  .  .
14  0  1  2  3  4  5  6  7  8  9 10 11 12 13 14
 0  1  2  3  4  5  6  7  8  9 10 11 12 13 14  0
 1  2  3  4  5  6  7  8  9 10 11 12 13 14  0  1
 2  3  4  5  6  7  8  9 10 11 12 13 14  0  1  2
 3  4  5  6  7  8  9 10 11 12 13 14  0  1  2  3
 4  5  6  7  8  9 10 11 12 13 14  0  1  2  3  4
 .  .  .  .  9  .  .  .  .  .  .  .  .  .  .  .
 .  .  .  . 10  .  .  .  .  .  .  .  .  .  .  .
 .  .  .  . 11  .  .  .  .  .  .  .  .  .  .  .
 .  .  .  . 12  .  .  .  .  .  .  .  .  .  .  .
 .  .  .  . 13  .  .  .  .  .  .  .  .  .  .  .
 .  .  .  . 14  .  .  .  .  .  .  .  .  .  .  .
 .  .  .  .  0  .  .  .  .  .  .  .  .  .  .  .
 .  .  .  .  1  .  .  .  .  .  .  .  .  .  .  .
 .  .  .  .  2  .  .  .  .  .  .  .  .  .  .  .
14  O  1  2  3  4  5  6  7  8  9 10 11 12 13 14
```

REDUCED POWER SLEEP MODES FOR MOBILE TELEPHONES

CROSS REFERENCE TO RELATED APPLICATIONS

This application contains subject matter which is related to co-pending U.S. patent application Ser. No. 08/147,254, entitled "A Method for Communicating in a Wireless Communication System", filed in the name of Raith et al. on Nov. 1, 1993. This co-pending application is incorporated herein by reference. This application also contains subject matter which is related to co-pending U.S. patent application Ser. No. 08/467,876 filed on Jun. 6, 1996, entitled "Enhanced Sleep Mode" to Raith et al., the disclosure of which is incorporated here by reference.

BACKGROUND

The present invention is directed to a method and an apparatus for reducing the mean standby power consumption of battery operated cordless or radio telephones.

It is known in the prior art that mean power consumption of battery operated portable telephones can be reduced on standby mode, that is, during the time between conversations when waiting for the subscriber to initiate a new call or receive a call from the network. The principal mechanism to reduce standby power consumption is to turn off the transmitter so that only the receiver is operating, listening to a designated network calling channel. However, modern hand-held telephones are so small that the available capacity of the small internal batteries is only sufficient to run the receiver continuously for a few hours. Accordingly, another method has been described in the European Global System for Mobile Communications (GSM) digital cellular system standard to further reduce receiver standby power consumption. This method involves pulsing the receiver on and off with a low duty factor, the periods the receiver is on being known to the network in advance for each portable station so that the network can time the sending of messages and call a particular mobile subscriber at those instants.

Portable telephones are, according to the GSM system specification, divided into sleep-mode groups either according to some of the digits of their telephone numbers or as designated by the network operator. As a simple example, those telephones having a number ending in 0 could belong to sleep-mode group 0; those ending in 1 to sleep-mode group 1 and so on. The network calling channel capacity is divided in time into a number of cyclically repeating periods corresponding to the sleep-mode groups. A call to a telephone is then transmitted only in a period corresponding to its sleep-mode group, when it is known to be awake. Upon waking, receiving such a message from the network and detecting that its own telephone number or identification number (ID) is being called, the portable receiver may stop pulsing and remain on continuously to receive further information and the portable transmitter may be activated to reply to the call when the subscriber accepts the call by, for example, pressing an appropriate button.

One limitation of these conventional paging techniques is that a mobile station may miss a call from the network due to temporarily being in a radio shadow from the calling station. Limited radio capacity on the calling channel prevents the network from simply repeating the call indefinitely until answered, or even more than a couple of times. Another limitation of these conventional techniques is that the duty factor of the portable receiver can not be reduced indefinitely during standby due to the consequent delay in placing a call. A certain minimum time is required to transmit sufficient information to identify a particular mobile and the opportunities to call that mobile station arise N times less frequently where N is the number of sleep-mode groups or the reciprocal of the receiver standby duty factor. The minimum time required for transmission is typically at least 40 milliseconds (ms), while the opportunities to call the mobile station typically arise every 40×N ms. If N is 50 for example, up to 2 seconds delay is incurred in calling a portable telephone, and if typically two attempts are made, this delay can be as high 4 seconds. Greater delays than these are not desired by subscribers that lead a hectic daily life requiring prompt call placement.

SUMMARY

The invention seeks to extend the battery life of a portable telephone beyond the now typical 4 to 12 hour period between charges to achieve 24 hours or indeed several day charging cycles. This is achieved by recognizing that immediate response to call placement is not critical during periods outside a subscriber's normal daily working times, for example at night, and also that the network has spare calling channel capacity outside the daily busy-hour traffic peak for which it would customarily be dimensioned. These factors are exploited to achieve a nighttime sleep-mode of significantly lower receiver standby duty factor than in daytime, reducing mean battery consumption averaged over a 24 hour period or more.

According to one exemplary embodiment of the present invention, a second nighttime or "deep sleep" mode is provided during which a mobile or remote station wakes up even less frequently to listen for paging messages. This deep sleep mode can be invoked either by the network, which broadcasts the frequency at which it will page mobile stations, or by the mobile station itself. For example, the mobile station can listen to paging messages directed to other mobile stations to determine the periodicity at which the base station is transmitting pages. Then, it can determine whether or not a deep sleep mode is appropriate. Alternatively, deep sleep mode can be entered when invoked by a user of the mobile station, for example by entering a command via a keypad.

According to other exemplary embodiments of the present invention, paging is made more efficient to further conserve system resources. For example, the system or base station can assign each mobile station to a sleep mode time slot based upon its mobile identification number in such a way that one or more digits of the mobile identification number need not be transmitted as part of the paging message. For example, a last digit of the mobile identification number can be associated with a sleep mode time slot. Thus, the base station need not transmit the last digit which will be implicit given the mobile station's assigned sleep mode time slot. Other logical combinations of the MIN can also be used to render implicit one or more digits thereof so that the amount of signalling involved in paging can be reduced.

According to another exemplary embodiment of the present invention, a mobile station can be provided with techniques which allow for decoding of a paging frame to terminate when a single miss-match occurs between its mobile identification number and the address received as part of the paging message. For example, maximum likelihood sequence estimation techniques can be used to create hypotheses of the received symbols. These hypotheses can then be compared with each sequential digit of the mobile identification number. If none of the hypotheses corresponding to a particular bit position of the mobile identification number match the value for a given mobile station, then the mobile station can stop decoding the paging frame.

According to another exemplary of the present invention, the paging message can also include broadcast control information relating to, for example, neighboring base stations, neighboring base station's control channels or authentication information. In this way, the mobile station need only awaken for its assigned paging time slot rather than both its assigned paging time slot and a subsequent broadcast information slot.

BRIEF DESCRIPTION OF THE DRAWINGS

The invention of the present application will now be described in more detail with reference to the preferred embodiments of the method and apparatus, given only by way of example, and with reference to the accompanying drawings, in which.

DETAILED DESCRIPTION

Figure 1:
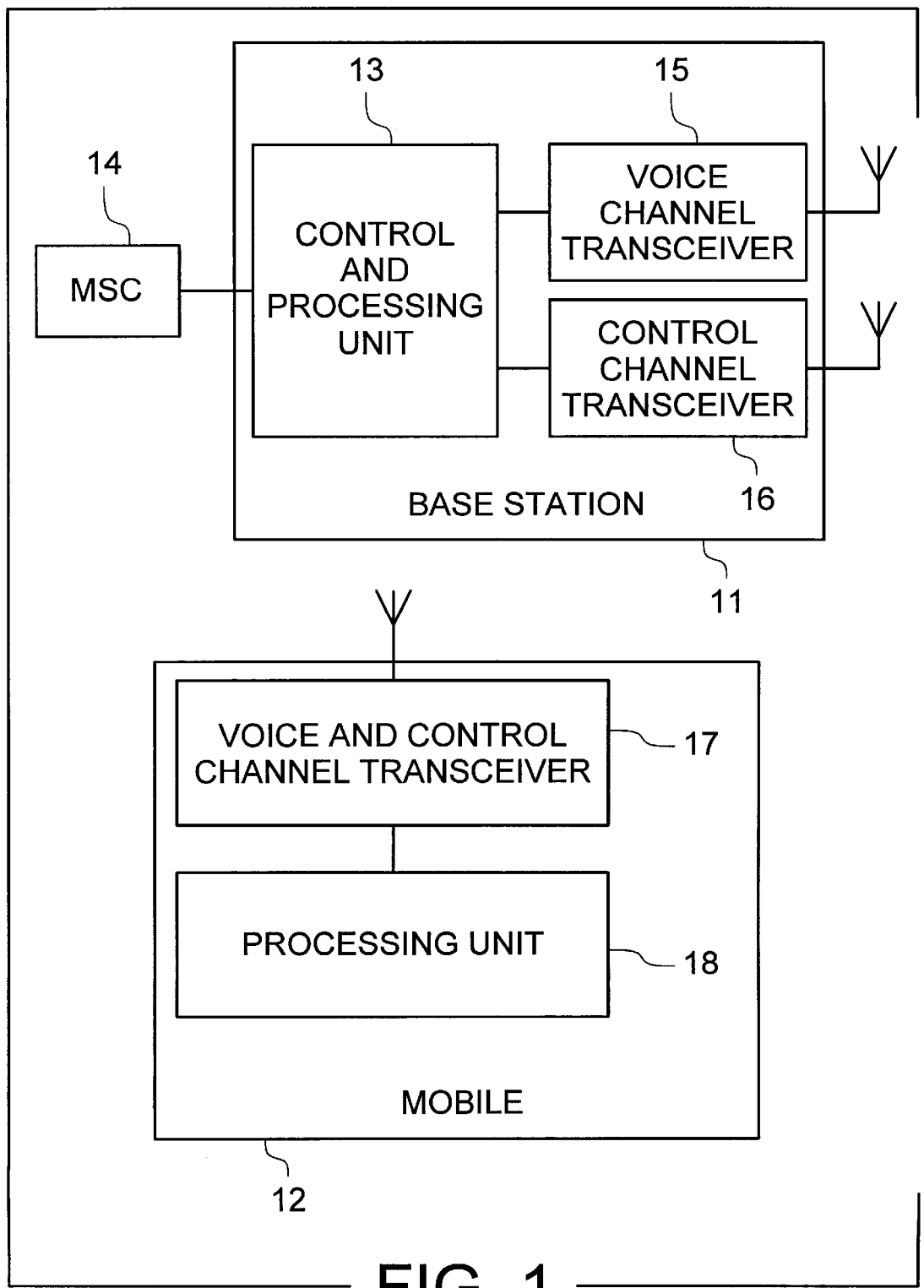
FIG. 1 is a general block diagram of an exemplary radiocommunication system.

To provide some context for discussing the present invention, a general discussion of some of the elements of an exemplary radiocommunication system are described below with respect to FIG. 1. FIG. 1 represents a block diagram of an exemplary cellular mobile radiotelephone system, including an exemplary base station 11 and mobile station 12. The base station includes a control and processing unit 13 which is connected to MSC 14 which in turn in connected to the PSTM (not shown). General aspects of such cellular radiotelephone systems are known in the art, as described in U.S. Pat. No. 5,175,867 entitled "Neighbor-Assisted Handoff in a Cellular Communication System" by Wejke et al., and U.S. patent application Ser. No. 08/967,027 entitled "Multi-Mode Signal Processing", both of which are incorporated in this application by reference.

The base station 11 handles a plurality of voice channels through a voice channel transceiver 15, which is controlled by the control and processing unit 13. Also, each base station includes a control channel transceiver 16, which may be capable of handling more than one control channel. The control channel transceiver 16 is controlled by the control and processing unit 13. The control channel transceiver 16 broadcasts control information over the control channel of the base station or cell to mobiles locked to that control channel. It will be understood that the transceivers 15 and 16 can be implemented as a single device, like the voice and control transceiver 17, for use with DCCs and DTCs that share the same radio carrier frequency.

The mobile station 12 receives the information broadcast on a control channel at its voice and control channel transceiver 17. Then, the processing unit 18 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332, which is incorporated in this application by reference.

According to exemplary embodiments of the present invention, the portable station adopts a sleep-mode in which mean receiver standby power consumption is reduced by a first factor during normally busy periods of the day that require prompt response to calls, and adopts one or more alternate sleep-modes of further reduced mean standby power (i.e., "deep" sleep modes) during periods of lower expected activity when a greater delay in responding to calls can be tolerated. The difference in the alternate sleep-mode could be, for example, that portable telephones are divided into a larger number of sleep-mode groups, using for example two digits of their telephone number to define 100 groups instead of one to define 10 groups. In this way, standby power is reduced by a further factor (ten, for example) at the expense of a greater delay in responding to calls from the network. Adoption of the first sleep mode or the second (i.e., deep sleep) mode can occur by command from the network to the mobile phone, automatically upon expiration of a time out after a period of inactivity or by user action (e.g., going into a displayed menu and selecting a "DEEP SLEEP" option).

For purposes of the instant description, the terms "portable telephone", "mobile telephone", and "mobile stations" are used interchangeably to refer to battery powered cellular telephones. A number of variations in the invention are distinguished by the various options for the strategy the network adopts to ensure that the portable telephone does not miss calls even though its receiver is awake less often due to the reduced number of sleep-mode groups in the system. A first strategy is for the network also to adopt an alternate sleep-mode operation during periods of lower activity corresponding to the alternate portable telephone sleep-mode. The format of network transmissions on the calling channel in this strategy would continue to match the sleep pattern of the portable telephones.

The adoption of such an alternate mode in the network and the portable telephones would be synchronized by the network including such information in its calling channel broadcast transmissions. According to one embodiment, the indication of which of the alternate sleep-mode formats is in use at any given time would be broadcast continuously so that a portable telephone just switching on can determine the format in use. The use of this strategy required that all telephones are placed in the alternate sleep-mode at the same time. It is not readily possible for one or a few telephones to become highly active during this time and expect more prompt call responses.

The second strategy according to the present invention is for the network to retain the same sleep-mode structure outside the normally busy period, allowing the portable telephones independently to choose the compromise between sleep-mode power savings and call response time. If the network then does not know what sleep format each telephone is adopting, it can only continue to call mobile telephones using the same format of transmissions adapted to the first sleep-mode. The use of this technique means some of the information transmitted may not have been received because a mobile telephone was sleeping longer than usual. This requires that the number of repeated call attempts to portable telephones be increased to account for the portable telephones being off and therefore unavailable to detect calls for a greater proportion of the time. However, this can be accommodated by use of the excess calling channel capacity available outside the busy hour. A combination of both strategies could be employed by one of ordinary skill in the art once in possession of the instant disclosure.

According to one exemplary embodiment, the mobile station can read paging messages sent to other mobile stations to learn how many times the system repeats a page. For example, if the system is repeating pages twice, then the mobile station can enter a deep sleep mode where it awakens only for every other assigned paging time slot. The mobile station may periodically (e.g., once per minute) to verify that the system is continuing to send paging messages at the last measured periodicity.

Figure 2A:
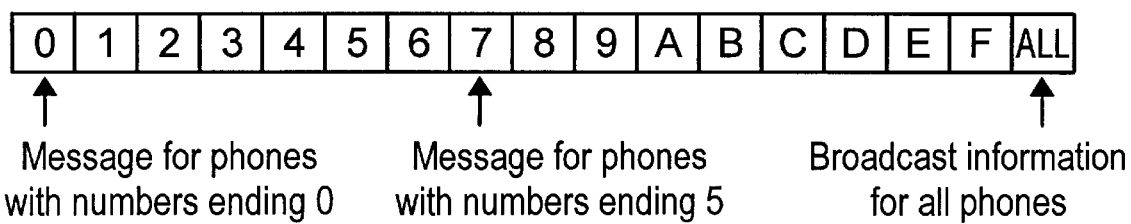
FIG. 2A illustrates the format of calling channel transmissions from a base station in a network using sleep-modes known in the prior art.
Figure 2B:
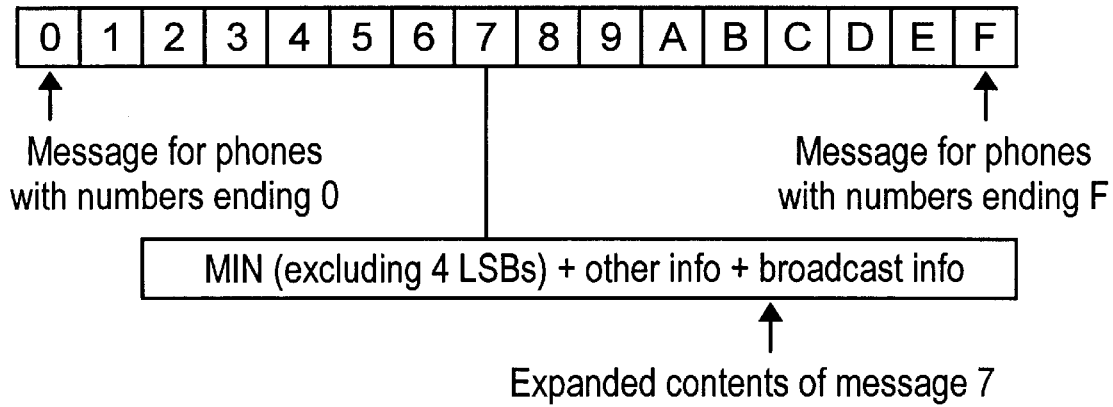
FIG. 2B illustrates the format of calling channel transmissions from a base station using sleep-modes according to an embodiment of the present invention.

FIG. 2A shows the format of calling channel transmissions from a base station in a network using sleep-modes known in the prior art and FIG. 2B shows the format of calling channel transmissions from a base station using sleep-modes according to one embodiment of the present invention.

In FIG. 2A, a repetitive transmission cycle comprises 17 time periods, corresponding to 16 sleep-mode groups plus one period that is read by all portable telephones containing broadcast information. According to one embodiment, the broadcast information includes details of surrounding base stations and calling channels used for transmitting calls and a random number used in an authentication algorithm to verify the authenticity of subscriber telephones attempting to communicate with the network. This random number may be changed on an infrequent basis. Authentication techniques, generally, are described in U.S. Pat. No. 5,091,942, the disclosure of which is incorporated here by reference. It is likely that not all such broadcast information can be contained within one broadcast period, so a further sub-multiplex of this channel is implicit but not shown. Portable stations may be assigned and belong to one of the 16 sleep-mode groups on the basis of 4 bits of their telephone number represented in a compressed binary form called the mobile identification number (MIN) in cellular radio parlance. The MIN is typically 34 bits. It is also possible to form four bits to determine the sleep-mode group by forming four different logical combinations of all 34 bits so that the distribution of mobile telephones between sleep-mode groups is not dependent on any policy for allocating particular MINs to particular subscribers.

One disadvantage of the format shown in FIG. 2A is that portable receivers have to wake up twice per cycle, once to receive messages in their own sleep-mode group and another time to receive the broadcast information. In the format shown in FIG. 2B, which is not believed to be described in the prior art, the inventors propose that broadcast information should be contained in every period so that the need to wake up a second time within one cycle specifically to receive broadcast information is eliminated. That is, as shown in FIG. 2B, each time period would include the MIN, excluding the 4 least significant bits (LSBs) plus other information plus the broadcast information. Fewer bits of broadcast information can be transmitted per period by this means, so it takes longer for the portable station to receive a complete sub-multiplex frame of broadcast information. According to one aspect of the present invention, the broadcast information is structured such that portable stations have an option to receive the information within a shorter time by waking up for more than one consecutive period.

Figure 3:
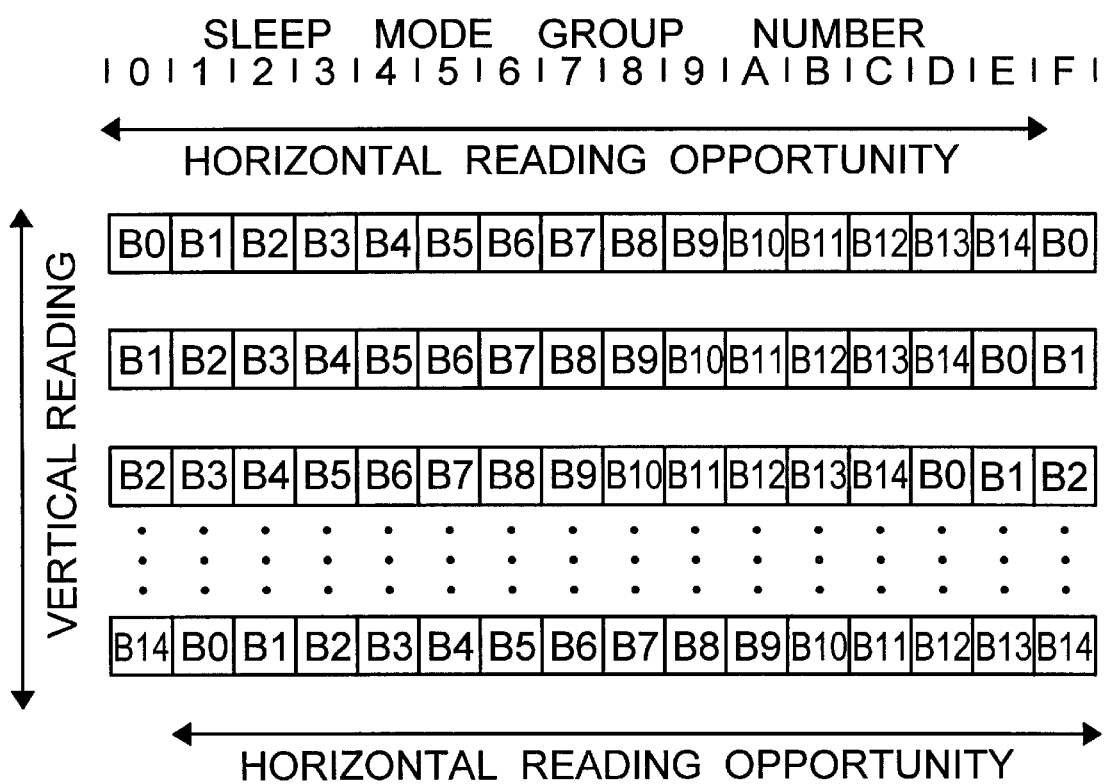
FIG. 3 illustrates sub-multiplexing of broadcast information according to an embodiment of the present invention.

FIG. 3 illustrates the sub-multiplexing of broadcast information. Using the method according to one aspect of the present invention, the broadcast information is divided into blocks of bits designated B0,B2,B3 . . . B14 and one block is transmitted in each period. Thus, B0 will be transmitted in sleep-mode period 0, B1 in period 1 and so on to B14 in period E. Then B0 is transmitted again in period F with B1 occurring in the next period 0, B2 in the next period 1 and so-on. Therefore, receiving any one of the sleep-mode slots alone will successively obtain B0,B1,B2 etc. as will receiving all sleep-mode slots successively. Thus, a portable telephone has the option to receive the broadcast information in blocks 0 to 14 only by waking up in its own sleep-mode period. Using this technique, it takes 14×16 periods to convey the whole of the broadcast information, or by waking up for 14 successive sleep-mode periods to receive the information more quickly. These dual reading opportunities are illustrated in FIG. 3.

Figures 4, 5:
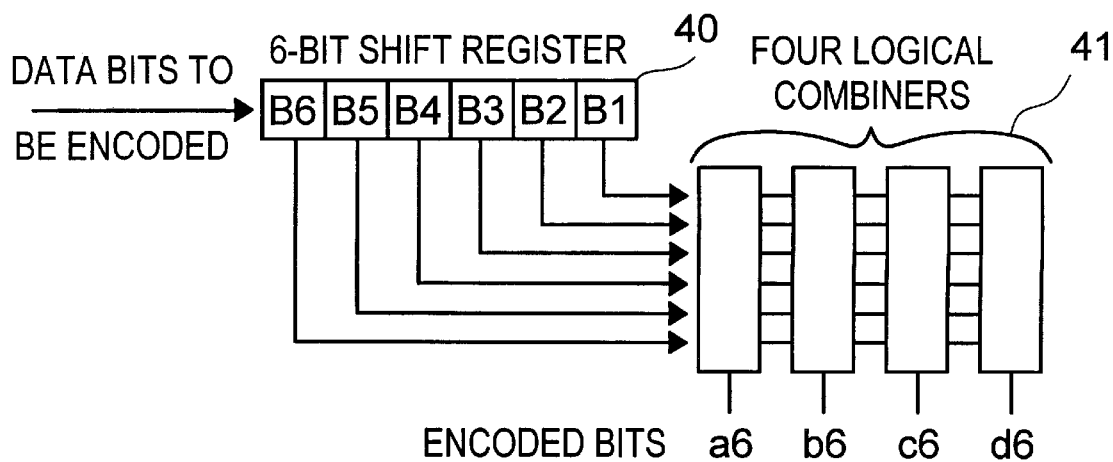
FIG. 4 illustrates the receipt of broadcast information in alternate sleep-mode slots according to an embodiment of the present invention.
FIG. 5 illustrates a rate 1/4 convolutional encoder according to the prior art.

FIG. 4 shows how the information may be received in an alternate, reduced standby-power sleep-mode in which the portable station only wakes up to received every other transmission in its sleep mode group according to an embodiment of the present invention. The broadcast information blocks in this case are not received in numerical order but may nevertheless be rearranged to reconstruct the complete information. The method of rearranging the blocks is within the skill of the ordinary artisan once in possession of the instant disclosure.

Waking in every alternate one of its sleep-mode slots, a mobile telephone receives broadcast information, as shown in the bold numbers in FIG. 4, in the following order:

4 6 8 10 12 14 1 3 5 7 9 11 13 0 2

When reordered, the entire broadcast information may be decoded.

Because the number of blocks of broadcast information is 15 in this example, it is not possible to receive all blocks by waking up regularly every third or fifth transmission. If the number of blocks is deliberately chosen to be a prime number, however, the mobile station can wake up with any regularity not a multiple of this prime number and still receive all blocks in the broadcast information. Even when the number of blocks in a broadcast cycle is not a prime number, the mobile station can wake up in an irregular pattern to receive all blocks.

According to another aspect of the invention, the bits of the MIN implicit in the sleep-mode period do not need to be transmitted when calling a particular telephone, leaving more bits to be used for other purposes such as assigning a traffic channel on which the telephone may eventually reply to the call. For example, if telephones having a MIN ending in the hexadecimal digit E listen to sleep-mode period E only, then the telephone with MIN=139A5DB2E(HEX) can be called by transmitting only 139A5DB2 in the message. This can also be done when the sleep-mode group is a combination of bits of the MIN. For example, if the sleep-mode group to which a mobile belongs is given by the modulo-16 sum of all the digits of its MIN, the telephone with MIN "139A5DB2E" will belong to sleep mode group 4, being the modulo-16 sum of all the hexadecimal digits. By transmitting "139A5DB2" in sleep-mode period 4, the telephone is still uniquely identified. To determine if it is being called, the telephone could form the modulo-16 sum of the digits transmitted, obtaining 6, and then using the information that the modulo-16 addition of the last, untransmitted digit must yield 4, deduce that the last digit must be E. In fact, if the transmitted digits match the MIN so far, there is only one possibility for the last digit that could result in that MIN being transmitted in sleep-mode group 4, so the portable need only check if the first 8 digits match, then a match of the ninth digit is implicit. This property holds also when any other logical combinations of the bits of the MIN are used to map all possible MINs having N-4 of their bits identical to the 16 sleep-mode groups in a 1:1 fashion. Those skilled in the art will appreciate that although the foregoing example refers to sixteen sleep-mode slots distinguishable by four MIN bits, that this concept can be extended, e.g., to 32 sleep-mode slots which implicitly refer to 5 MIN bits.

When employing the strategy of permitting portable stations autonomously to adopt an alternate, lower duty factor sleep-mode, the portable station may be adaptive to the amount of use it experiences. For example, if no call has been placed or received for one hour, it may automatically enter the alternate sleep-mode, reverting to the normal sleep-mode if a call is placed or received, indicating possible recommencement of a period of high activity.

One embodiment of the present invention is described in the context of a digital cellular system employing time division multiple access (TDMA). Base stations of the TDMA network may transmit information on any of a number of available frequency channels and on any of three, 6.6 ms available timeslots that recur every 20 ms. The majority of frequency channels carry three different traffic signals or conversations on their respective timeslots; some frequency channels, however, have one or more timeslots designated to be calling channels, used to broadcast network-originated calls or other information to portable telephones. A 20 ms cycle of three timeslots is called a TDMA frame, and a sleep-mode structure is imposed on the calling channel by defining a superframe of, for example, 32 TDMA frames, each corresponding to one of 32 sleep-mode groups. As described above, the sleep-mode group to which a portable station belongs is determined by the last five bits of its MIN and this determines which of the 32 TDMA frames within a superframe the portable station will wake up to receive. A portable station in a first standby mode is thus able to receive one of the three timeslots in one of the TDMA frames every superframe, with a theoretical receiver standby duty factor of 1/96. In fact, however, the reduction of power compared to normal TDMA operation is by a factor of 32, as in normal TDMA operations also only one of 3 timeslots per frame need be received in any case. A device will later be described for reducing power still further by not decoding all bits of the calling channel message.

In both normal operation and in sleep-mode, the receiver may use some of the other two-thirds of a frame to scan other frequencies and monitor the strengths of signals from other base stations that it receives on those frequencies. The frequencies scanned would normally be indicated to the portable receiver in the broadcast information, and these frequencies would normally be those of the calling channels of surrounding bases, i.e., very static information.

A feature of at least the calling channels in a system according to the present invention is that the base station transmits continuously in all three timeslots even though only one may be used for a calling channel and if the other two contain no traffic, dummy information is inserted. This avoids the portable station having to scan the calling channels only at particular times when the carrier is known to be operational.

When the network wishes to call a portable station, an error-correction coded message containing the portable station's identification number less those bits implicit in the sleep-mode group is transmitted using only the timeslots of the calling channel and in the TDMA frames of the portable station's sleep-mode group. Each coded message may be interleaved over two consecutive such slots, and sufficient coding should be employed such that the message may be decoded if only one slot is received with a high quality. For example, rate 1/4 convolutional encoding may be used, which can be decoded even if half the bits are not received. Furthermore, a call to a portable station is typically not transmitted just once but is repeated one or more times depending on calling channel loading. Essentially, the same message may be repeated using subsequent timeslots and frames of the same sleep-mode group as long as no other call is in the queue.

The interleaving of coded message bits half on one timeslot and half on the next combined with repeating the message has the effect that all the bits of the message are discernible on all but the first and last timeslots used. If a coded message A is split into two halves A1 and A2 and messages B and C are likewise split, then transmission of messages A,B,C in succession without repeats results in timeslots containing X+A1, A2+B1, B2+C1, C2+Y . . . , where X and Y represent half the bits of preceding and following messages. It is necessary in this case to receive all the bits of coded message B for example, to receive two timeslots in succession containing A2+B1 and B2+C1 respectively, and to pick and assemble the bits B1 and B2 from the two slots for decoding.

On the other hand, if the same message B is repeated three times, the slots would contain X+B1, B2+B1, B2+B1, B2+Y . . . , showing that in principle the whole of the message B is discernible in either of the middle two timeslots alone.

The interleaving of the calling message over successive frames in a sleep-mode group gives 32×20 ms of time diversity to help against slow Rayleigh fading experienced by slowly moving handheld portable telephones or against shadow fading experienced by more rapidly moving mobile telephones that may temporarily drive under a bridge. An intelligent decoder, knowing or postulating how many times a particular calling message is repeated, can combine soft information from many slots best to decode the message. Soft information refers to the situation where the receiver produces demodulated output symbols that are classified not just into '1's and '0's, for example, but also indicates the degree of 'oneness' or 'noughtness' of each symbol. This soft information can be used in an error correction decoder that pays less heed to symbols whose value is doubtful. Ideally, soft information is indicative of the probability that a demodulated symbol is correct, and this indication is also preferably on a logarithmic scale.

A suitable error-correcting decoder for decoding rate 1/4 convolutionally coded information is a Viterbi Maximum Likelihood Sequence Estimator (MLSE) algorithm. The decoder contains a copy of the known rate 1/4 convolutional encoder, illustrated in FIG. 5. This consists of a shift register 40 that holds the last six bits of uncoded information to be entered, and four logical combiners 41 that outputs four different combinations of the six bits (a6, b6, c6, d6) according to the known art of convolutional encoding. Since only 2 to the power 6 possible patterns of input bits exist, the 4-bit output of the combiner for all possible cases can be precomputed and stored in a 64×4 bit look-up table or read only memory (ROM). A ROM is thus a practical implementation of a convolutional encoder.

Figure 6:
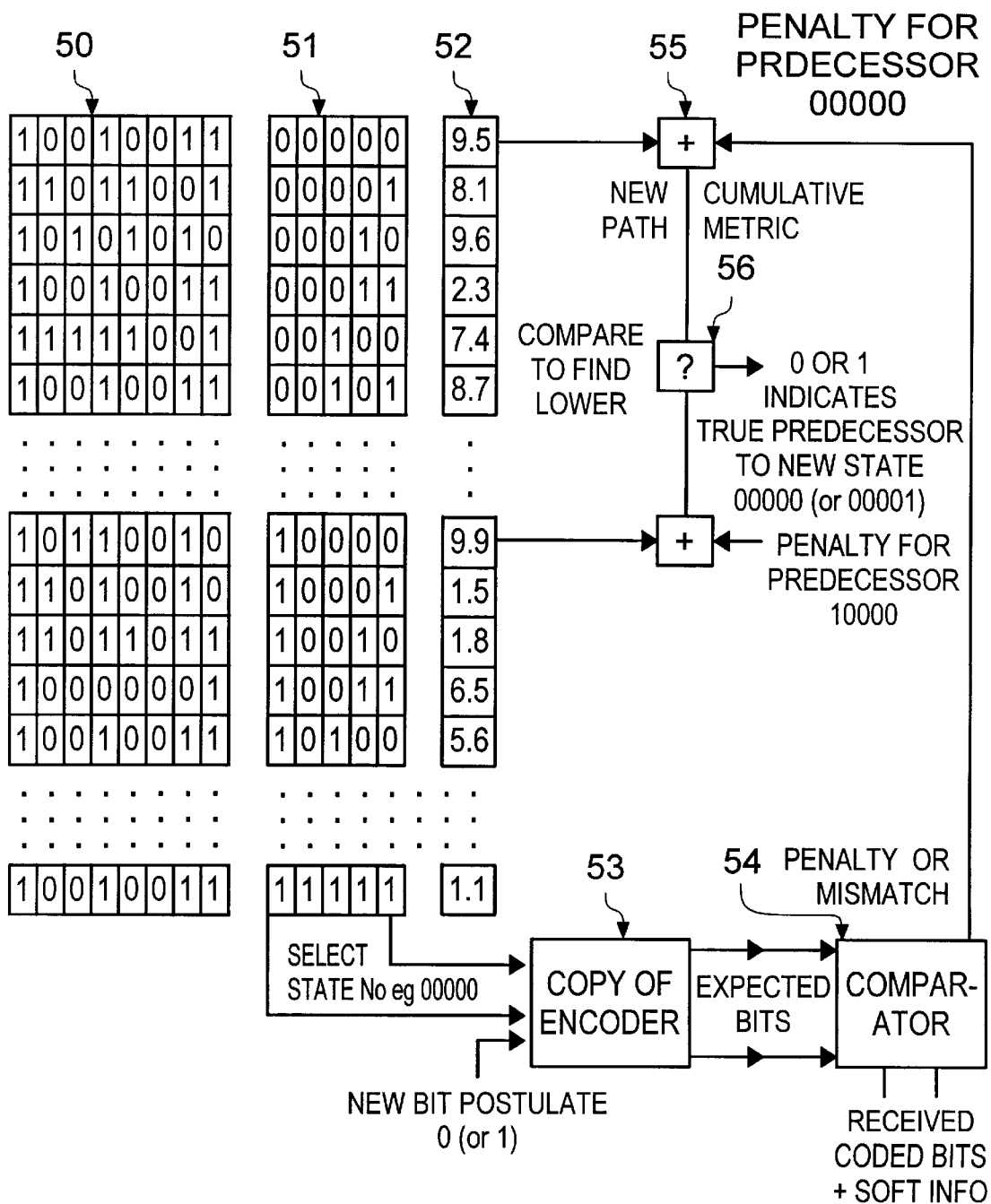
FIG. 6 is a block diagram of a Viterbi MLSE decoder according to an embodiment of the present invention.

The corresponding decoder according to the present invention is shown in FIG. 6. The decoder includes a history memory 50, preferably implemented as a plurality of shift registers, although other hardware implementations are possible and within the skill of the ordinary artisan once in possession of the instant disclosure. The decoder further includes a plurality of state number registers 51 and a plurality of path metrics registers 52. The path metrics registers store path metrics, that is, cumulative measures of the probability that the state register or decoder contains the correct decoded bit sequence.

The principle of the decoder is to postpone a unique decision on the polarity of decoded bits until they no longer influence the signal received. Accordingly, if we are currently attempting to decode bit i, bits i-1, i-2, i-3, i-4 and i-5 are still in the shift register also and thus may influence at least some of the four bits produced by the encoder. Thus, if no firm decision has yet been taken on these bits, all 32 possible states of the 5 bits must be considered when decoding the current bit. The Viterbi MSLE decoder thus has actually 32 decoders operating in parallel, called 'states'. The states are stored in state registers 51 and each state corresponds to one postulate for the preceding five bits, i.e. 00000, 00001, 00010 . . . 11111. One (decoded) bit period later however, the oldest (leftmost) bit in the pipeline will cease to influence the four encoded bits so it will not matter whether it was a 0 or a 1 in decoding bit i+1 and the number of states can be halved. On the other hand, the number of states must be doubled again to encompass the two possible postulates for the new bit i+1. Therefore at each step of the MSLE algorithm, the number of states after one iteration is the same, 32 in this case, as the number of states before. How the new states are derived from the old states will now be explained.

The possible predecessors of new state 00000 are old states 10000 and 00000 plus a new decoded bit postulate of 0. To determine which of these is the most likely predecessor, the five bits 00000 plus the new 0 postulate are applied to the copy of the encoder at 53 to generate four encoded expected bits. These are compared in turn at 54 with the signal values received and if they disagree, a penalty is added at 55 to the path metric register 52 of state 00000 to obtain a new path metric. As noted above, the path metrics stored in the path metric registers 52 are cumulative measures of the probability that state or decoder contains the correct decoded bit sequence. By using a logarithmic measure of probability, additive accumulation of a penalty corresponding to minus the probability that a demodulated bit is of correct polarity has the same effect as cumulatively multiplying probabilities, but is simpler to implement. The interested reader can obtain more information regarding the calculation of path metrics by reading U.S. Pat. No. 5,577,053, the disclosure of which is incorporated here by reference. A new path metric is also obtained in the same way using previous state 10000 plus a new 0. Whichever of these possible predecessors results in the lowest new path metric at 56, is then chosen to be the predecessor to new state 00000, and the corresponding new path metric is tried against new state 00000. To indicate which predecessor was selected, 00000 or 10000, a 1 or a 0 (the oldest or leftmost bit) is placed in the output shift register associated with decoder 00000. This corresponds to taking a firm decision on the oldest bit in the state number, at least for this decoder; there remain 31 other decoders yet to choose from.

By postulating that the new bit to be decoded is a 1, a choice is made in the same way between states 00000 and 10000 as possible predecessors to new state 00001. Likewise, choosing between states 0abcd and 1abcd using first a postulate that the new bit is a 0 and then that it is a 1 yields new states abcd0 and abcd1. In this way 32 new states are derived from the 32 old states and one iteration cycle is completed. It should also be mentioned that, when a predecessor state is selected to derive a new state, the contents of the predecessor's decoded-bit shift register are copied into the new state along with the leftmost bit of the predecessor state, indicating which one was selected. Finally, when all received data has been processed, the state having the lowest path metric is selected as the decoder containing the most likely decoded bit sequence.

Such a convolutional decoder executes many operations per decoded bit and this device can be a significant contributor to the operating power consumption of the portable receiver. According to another aspect of the invention, the inventors propose to terminate the decoding of bits as soon as it is determined that a transmitted calling message does not contain the MIN, i.e., the MIN of the portable telephone receiving the message. This is achieved as follows.

When all 32 decoders shift registers have received a decoded bit corresponding to a first bit of the MIN in the message, these 32 decoded bits are compared with that bit of mobile stations MIN. If no bit matches the mobile station's MIN, then no state of the decoder will ever decode the mobile station's MIN and the decoder can go back to sleep, saving power. If at least one of the 32 bits matches the mobile station's MIN the decoder continues.

After all 32 decoders or states have decoded a second bit of the MIN contained in the message, the first and second bits of the MIN in each of the 32 states are compared with corresponding bits of the mobile station's MIN. If no state matches both bits, decoding can be terminated. This process continues as subsequent bits are decoded until either 'no match' is decided, or until the mobile station's MIN is detected in its entirety in one or more of the 32 states. At this point decoding of the rest of the message is continued. Due to the way the shift register contents of the 32 decoders overwrite each other at each iteration, it is possible that the states that originally contained the mobile station's MIN will be overwritten. Therefore, it is still worth continuing to check for the MIN even when decoding message bits other than those of the MIN.

As an alternative means to reduce decoding effort and save power, the inventive method is proposed of deleting states from the decoder that do not match bits of the mobile station's MIN, given that a mobile station is only interested in messages that contain its own MIN. This method is appropriate when the bits of the MIN are not transmitted sequentially, but are interspersed with the transmission of other, non-MIN bits. The operation of an MLSE decoder according to this aspect of the invention is understandable to a person ordinarily skilled in the art of Viterbi algorithms once in possession of the present disclosure and need not be elaborated here.

Figure 7:
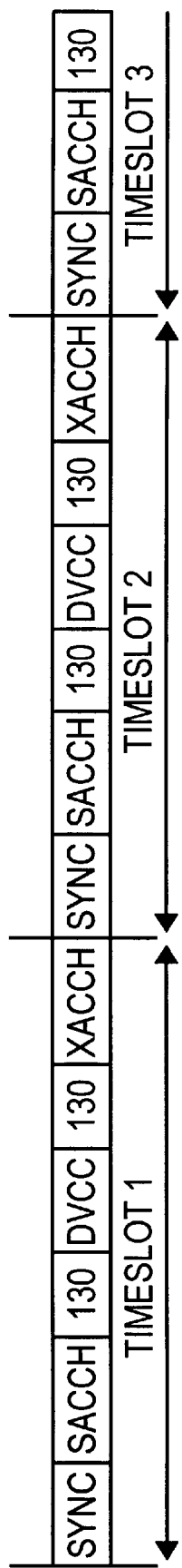
FIG. 7 illustrates the TDM structure of an IS-54 base-to-mobile station communication used in accordance with an embodiment of the present invention.

To ensure that decoding is not prematurely terminated without having received the broadcast information that the portable station needs, it is desirable either that the broadcast information bit-block be encoded and transmitted first, or that a separate encoding and decoding process be provided for these bits. A suitable time division multiplexing access (TDMA) transmission format for the latter case is that used in the U.S. digital cellular system standard IS-54B, shown in FIG. 7.

The TDMA frame of FIG. 6 consists of three identical subframes or timeslots that form a continuous transmission. Between each timeslot there are 12 bits transmitted that are presently spare. Each slot otherwise begins with a 28-bit known symbol pattern used for synchronization and equalizer training, then followed by a 12-bit field known as the slow associated control channel (SACCH) and 260 information bits located in two blocks of 130 surrounding the 12-bit CDVCC (coded digital voice color code). In IS-54B, the 130+130 information bits are described as containing either coded digital voice or rate 1/4, convolutionally encoded messages called the fast associated control channel (FACCH). To implement the present invention conveniently in such a digital cellular system, this format can be adopted unchanged by redefining the 130+130 bit information to be rate 1/4 convolutionally encoded calling messages using the same coding as for FACCH, using the SACCH field to convey the broadcast information using the separate SACCH interleaving and coding scheme, and using the DVCC field to identify the sleep-mode group to which each TDMA frame/slot belongs.

The FACCH coding is known as convolutional encoding with tail-biting. Tail-biting refers to the means of initiating and terminating the decoding of a message. Referring to the convolutional encoder of FIG. 4, it can be seen that the encoder shift register must contain 6 bits at all times to generate valid coded bits. One way of ensuring this is to initialize the encoder with zeros, or at least 5 known bits and the first bit to be encoded. After extracting four coded bits, a new data bit is shifted in and so on. To terminate the encoding process however, the last bit must travel all the way through all six shift register positions, necessitating that five known bits are shifted in to flush the last data bit through. This results in the number of coded bits generated being 4N+20 where N is the number of data bits encoded.

In the tail-biting approach, the shift register is initialized with the first six bits to be encoded. Groups of four coded bits are extracted and then a new data bit is shifted in. Finally, when all data bits have been used, the first five data bits are used once more to flush the last bit through. In this way, the first five bits get their turn in every position in the shift register, either at the beginning or the end, and so get the chance to affect as many coded bits as other data bits. This process may be regarded as starting with a ring of N bits and transforming it to a ring of 4N bits. It will be seen that the same ring of 4N bits is produced, apart from a rotation, wherever one starts the process in the ring of N data bits. Likewise, the decoding of the ring of 4N coded bits back to a ring of N bits can start anywhere in the circle. This approach avoids wasting 20 coded bits for initializing and terminating the coder/decoder. Consequently, the 260 coded bits transmitted decode to precisely one-quarter that number, i.e., 65 data bits.

The 65 bit decoded message must convey at least the 34-bit MIN of the mobile telephone being called. Since according to one aspect of the current invention, the bits of the MIN implicit in the sleep-mode slot do not need to be included in the message, 34 minus 5 (29) out of the 65 are needed for the MIN, leaving 36 for other purposes. Ten bits may be used to define one of 1000 frequency channels that the portable station uses to reply to the call, and two bits may be used to specify whether timeslots 1,2 or 3 of a TDMA channel shall be used or whether the channel is an FDMA channel. Of the 19 bits remaining, 12 to 16 may be used for a CRC check that the error correction decoding has succeeded, and the remaining 3–7 bits are used for at present unspecified purposes.

If the coded bits of the MIN content of the message are produced sequentially by the encoder, regardless of whether they are produced first or last by the encoding decoding can begin at the MIN bits, by virtue of the cyclicity of the tail-biting encode/decode process. Thus, the MIN can be decoded bit by bit first of all, terminating decoding as soon as it is clear no match to the mobile station's MIN will result, saving power.

If the MIN bits are not fed sequentially through the encoder, but interspersed with other data, another aspect of the invention is employed to reduce decoder effort and improve performance, namely to eliminate decoder states or transitions between states that do not produce the mobile station's MIN bits in the decoder shift registers.

It will be noticed that, although five bits of the MIN corresponding to the sleep-mode group do not have to be transmitted, the sleep-mode group to which a particular slot belongs has to be identified somehow. This frame marking is provided in the above by the DVCC field. This 12-bit field contains one of 32 coded bit patterns corresponding to which of the 32 sleep-mode slots it is in. There is a logical equivalence between describing an aspect of the invention as eliminating the need to transmit certain MIN bits that are implicit in the sleep-mode slot in which the transmission occurs, but then transmitting some bits to identify the sleep-mode slot, or as transmitting the whole MIN in coded form, but regarding some of the coded MIN bits as identifying the sleep-mode slot of the transmission.

The above format can for example, implement two alternate levels of coding for the invention, by using rate 1/2 coding for "first-try" calls and rate 1/4 (as per the FACCH) for "second-try" calls. In the first case, two calls to two mobile stations may be packed in the same burst to save paging capacity. If such a message is not received by one or the other mobile station on the first broadcast, the network may re-page the mobile that has not yet responded using the rate 1/4 coding in a "second try" attempt to page the mobile station that did not respond to the "first try".

The above description shows how the invention achieves advantages enabling portable telephones to save power by entering a low-power sleep-mode when in standby. The portable telephones waken at regular intervals to receive information broadcast and specifically addressed messages on the network calling channel, but as soon as messages are detected to not contain any particular digit of the mobile telephone's number, the mobile telephone may cease decoding the message and go back to sleep. Furthermore, it has been described how the frequency at which the telephone wakes up may be determined by the mobile telephone itself, according to the level of activity or time of day, or as permitted by the network as indicated by broadcast information. Receipt of the very infrequently changed broadcast information is still guaranteed as long as the mobile telephone wakes up at intervals which are not a factor of the length of the broadcast message. In the preferred implementation just described, for example, the broadcast message length is 31 SACCH blocks long, which is one less than the number of sleep-mode groups. That allows both horizontal reading of the information as defined by FIG. 2 or vertical reading. Because 31 is a prime, the mobile telephone can enter reduced power alternate sleep-modes where it wakes up to receive only every second, third, fourth, etc of its sleep-mode slots, and still receives all 31 SACCH blocks in 31 waking periods. It is also possible to use broadcast information message lengths of one more than the number of sleep-mode groups, e.g., 33 in the preferred system. It can be shown that vertical reading then yields the message blocks in reversed order, but they can be reassembled for decoding or else the convolutional decoder run backwards, which works equally well.

The coding of the broadcast information in the preferred system can suitably be the same rate 1/2 convolutional encoding specified for the SACCH field in U.S. Digital Cellular Standard IS-54. Although the error-protection provided by rate 1/2 coding is less than for rate 1/4, this is adequate for the broadcast information which is repeated unchanged for long periods, as distinct from calls to a particular telephone, which are either not repeated or repeated only a few times.

It is clear that calls must be repeated by the network more often to guarantee an opportunity for receipt by a mobile telephone that has entered a further reduced-power, alternate sleep-mode. The network may have capacity for such repeats only outside busy periods of the day. Therefore, the network may broadcast information regarding how many call repeats are currently being made or similar information that permits the telephones to deduce what duty-factor sleep-modes are currently permitted. Whether the telephone adopts such a reduced sleep-mode can still however be decided by the telephone itself based on current activity.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A unit for use in a wireless telephone system having battery-saving standby modes, said unit comprising:
   receiver circuits for receiving transmissions from said telephone system;
   means for entering a first low-power sleep-mode during periods of normal expected use by disabling said receiver circuits and awakening from said low-power sleep-mode at regular intervals to receive a signal from said telephone system;
   means for entering a second low-power sleep-mode during periods of low expected use from which said telephone awakens less frequently than in said first low-power sleep mode and wherein said means for entering said second sleep-mode includes means for monitoring paging messages sent to other telephones to determine a periodicity of paging message transmission and wherein said means for entering said second sleep-mode enters said second sleep mode at times based upon said periodicity.

2. The unit according to claim 1, wherein said second low-power sleep-mode has a lower power level than said first low-power sleep-mode.

3. The unit according to claim 1, wherein said means for entering said second sleep-mode enters said second sleep-mode when an indication that said second sleep-mode is permitted is transmitted by said system.

4. The unit according to claim 1, wherein said means for entering said second sleep-mode enters said second sleep-mode when a user of said telephone inputs a command to enter said second sleep-mode.

5. A unit according to claim 1 in which said periods of low expected use are determined by a time-of-day clock.

6. A unit according to claim 5 in which said time-of-day clock is included in said telephone.

7. A unit according to claim 5 in which said time-of-day clock is broadcast by said radio communications system.

8. A unit according to claim 1 in which said periods of low expected use are determined by a time since last call.

9. A unit according to claim 8 in which said time since last call is measured using a timer built into said portable telephone.

10. A unit according to claim 1 further comprising:
    means to monitor activity by computing a cumulative activity value;
    means to increase said cumulative activity value whenever a call is placed or received;
    means to gradually decrease said cumulative activity value whenever said phone is not being used for conversation; and
    means to place said telephone in said first or second sleep mode based on said cumulative activity value.

11. A method for conserving battery power of a remote unit in a radiocommunication system comprising the steps of:
    operatively powering receiver circuitry when said remote unit is actively engaged in a connection with said radiocommunication system;
    entering a first low-power sleep-mode after said remote unit has released said connection, and during periods of normal expected use, by disabling said receiver circuits and awakening from said low-power sleep-mode at regular intervals to receive a signal from said telephone system;
    entering a second low-power sleep-mode during periods of low expected use from which said telephone awakens less frequently than in said first low-power sleep mode; and
    monitoring paging messages sent to other telephones to determine a periodicity of paging message transmission and wherein said means for entering said second sleep-mode enters said second sleep mode at times based upon said periodicity.

12. The method according to claim 11, wherein said second low-power sleep-mode has a lower power level than said first low-power sleep-mode.

13. The method according to claim 11, wherein said step of entering said second sleep-mode further comprises the step of:
    entering said second sleep-mode when an indication that said second sleep-mode is permitted is transmitted by said system.

14. The method according to claim 11, wherein said step of entering said second sleep-mode further comprises the step of:
    entering said second sleep-mode when a user of said telephone inputs a command to enter said second sleep-mode.

15. A unit for use in a wireless telephone system having battery-saving standby modes, said unit comprising:
    receiver circuits for receiving transmissions from said telephone system;
    means for entering a first low-power sleep-mode by disabling said receiver circuits and awakening from said low-power sleep-mode at regular intervals to receive a signal from said telephone system;

means for entering a second low-power sleep-mode during which said unit awakens less frequently than in said first low-power sleep mode;

wherein said means for entering said second low-power sleep-mode is commanded by a signal received from said telephone system.

16. A method for conserving battery power of a remote unit in a radiocommunication system comprising the steps of:

operatively powering receiver circuitry when said remote unit is actively engaged in a connection with said radiocommunication system;

entering a first low-power sleep-mode after said remote unit has released said connection by disabling said receiver circuits and awakening from said low-power sleep-mode at regular intervals to receive a signal from said telephone system;

receiving a command from said system to enter a second low-power sleep mode; and entering, responsive to said command, a second low-power sleep-mode from which said remote unit awakens less frequently than in said first low-power sleep mode.

17. A unit for use in a wireless telephone system having battery-saving standby modes, said unit comprising:

receiver circuits for receiving transmissions from said telephone system;

means for entering a first low-power sleep-mode by disabling said receiver circuits and awakening from said low-power sleep-mode at regular intervals to receive a signal from said telephone system;

means for entering a second low-power sleep-mode during which said unit awakens less frequently than in said first low-power sleep mode;

wherein said means for entering said second low-power sleep-mode includes means for monitoring an accumulated activity level of said unit and entering said second low-power sleep mode based on said accumulated activity level.

18. A method for conserving battery power of a remote unit in a radiocommunication system comprising the steps of:

operatively powering receiver circuitry when said remote unit is actively engaged in a connection with said radiocommunication system;

entering a first low-power sleep-mode after said remote unit has released said connection by disabling said receiver circuits and awakening from said low-power sleep-mode at regular intervals to receive a signal from said telephone system;

accumulating an activity level of said remote unit; and entering, responsive to said accumulated activity level, a second low-power sleep-mode from which said remote unit awakens less frequently than in said first low-power sleep mode.

* * * * *